United States Patent Office 2,803,653
Patented Aug. 20, 1957

2,803,653

SYNTHESIS OF STEROID INTERMEDIATES

Quentin E. Thompson, Belleville, Ill., assignor to Monsanto Chemical Company, St. Louis, Mo., a corporation of Delaware No Drawing. Application December 29, 1954,
Serial No. 478,487

9 Claims. (Cl. 260—514.5)

This invention relates to the synthesis of steroids. More particularly this invention relates to the synthesis of 1-($\beta$-carboxyethyl)-2-keto-14-methyl-$\Delta^{6,9,11(1)}$-octahydrophenanthrene

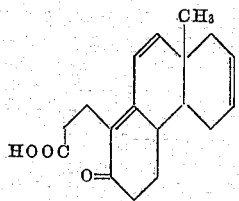

from 1-(hydroxy) methylene-2-keto-10-methyl-1,2,5,8,9,10-hexahydronaphthalene

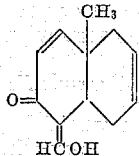

and to new compounds obtained thereby.

The sequence of steps or series of reactions proceeding to the 1-($\beta$-carboxyethyl)-2-keto-14-methyl-$\Delta^{6,9,11(1)}$-octahydrophenanthrene for purposes of this invention are outlined schematically as follows:

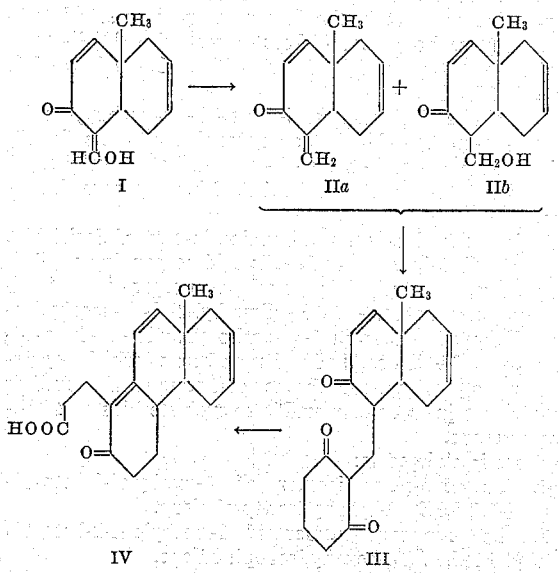

The initial reactant of the process outlined in the foregoing diagram, namely 1-(hydroxy) methylene-2-keto-10-methyl-1,2,5,8,9,10-hexahydronaphthalene

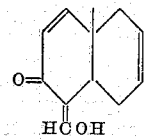

as will be obvious to those skilled in the art contains two asymmetric carbon atoms. As a result thereof such exists in the form of four optically active isomers or two racemates, i. e. cis and trans racemic mixtures of the dextro and levo optically active isomers. All such forms per se or in any combination thereof may be employed in the process outlined herein. The initial reactant (Compound I) is prepared by the formulation of the corresponding 2-keto-10-methyl-1,2,5,8,9,10-hexahydronaphthalene

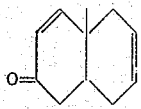

employing ethyl formate in the presence of sodium methylate. As illustrative of such is the following:

*Example A*

To a suitable reaction vessel is charged 17.3 parts by weight (substantially 0.32 mol) of solid sodium methylate, 75 parts by weight of anhydrous benzene and 37 parts by weight (substantially 0.5 mol) of ethyl formate while maintaining the temperature at about 20–25° C. The suspension so obtained is then agitated for about 20–30 minutes employing a nitrogen atmosphere and then cooled to about 10° C. Thereupon approximately 16.1 parts by weight (substantially 0.1 mol) of the levorotatory form of trans-2-keto-10-methyl-1,2,5,8,9,10-hexahydronaphthalene dissolved in 150 parts by weight of benzene is added and the mixture agitated for about 3 hours at about 15° C. The reaction mass so obtained is then quenched with cold dilute sulfuric acid (20 parts by weight sulfuric acid in 125 parts by weight of water) while maintaining the temperature at about 15° C. and agitating for about 5 minutes. The aqueous layer is separated and extracted with several small portions of benzene. The benzene extracts are combined with the original organic layer and the combined mix subjected to vacuum distillation. The light tan oily residue so obtained consists essentially (95% by weight) of the 1-(hydroxy) methylene derivative of the levo-rotatory form of trans-2-keto-10-methyl-1,2,5,8, 9,10-hexahydronaphthalene. The oil is admixed with 105 parts by weight of methanol and with agitation heated to about 50° C. While constantly agitating 400 parts by weight of an aqueous 5% copper acetate solution is slowly added. The precipitate, namely the copper chelate of the 1-(hydroxy) methylene derivative of the levo-rotatory form of trans-2-keto-10-methyl-1,2,5,8,9,10-hexahydronaphthalene, is filtered off, washed with methanol, and then slurried with 87 parts by weight of benzene. To the slurry so obtained is added 1800 parts by weight of 26% sulfuric acid. The organic layer is recovered, washed with aqueous sodium bicarbonate followed by a water wash, and the solvent removed in vacuum. The residue is the oily levo-rotatory isomer of trans-1-(hydroxy) methylene-2-keto-10-methyl-1,2,5,8,9,10-hexahydronaphthalene, B. P.

122–123° C. at 2–3 mm., $n_D^{25}=1.5570$, $[\alpha]_D^{25}=-151.6$ (c.=2, CHCl₃).

In a similar fashion dl-trans-1-(hydroxy) methylene-2-keto-10-methyl-1,2,5,8,9,10-hexahydronaphthalene is obtained from dl-trans-2-keto-10-methyl-1,2,5,8,9,10-hexahydronaphthalene. Also, similarly, dl-cis-1-(hydroxy) methylene-2-keto-10-methyl-1,2,5,8,9,10-hexahydronaphthalene is obtained from dl-cis-2-keto-10-methyl-1,2,5,8,9,10-hexahydronaphthalene.

In the first step of the process schematically outlined herein 1-(hydroxy) methylene-2-keto-10-methyl-1,2,5,8,9,10-hexahydronaphthalene is reacted with formaldehyde in the presence of aqueous alkali. This reaction provides a mixture of 1-methylene-2-keto-10-methyl-1,2,5,8,9,10-hexahydronaphthalene and 1-methylol-2-keto-10-methyl-1,2,5,8,9,10-hexahydronapthalene, the ratio of which depending upon the reaction conditions. It is preferred that the alkali material employed be an alkali metal hydroxide such as potassium or sodium hydroxide. In general the reaction temperature will be less than 25° C., the minimum temperature being that at which the reaction system is still fluid.

As illustrative of the initial step of the process outlined heretofore is the following:

*Example I*

To a suitable reaction vessel containing 45 parts by weight of sodium hydroxide dissolved in 1800 parts by weight of water maintained at about 5° C. is added approximately 350 parts by weight of 37% formaldehyde. This mix so obtained is maintained at 0–5° C. while adding thereto 190 parts by weight of the levo rotatory isomer of trans-1-(hydroxy) methylene-2-keto-10-methyl-1,2,5,8,9,10-hexahydronaphthalene dissolved in approximately 100 parts by weight of methyl alcohol. The yellow solution obtained is stirred at 0–5° C. for approximately 4 hours during which time the yellow solution fades in color and a white oil separates. Approximately 1600 parts by weight of diethyl ether is added, intimately mixed and the mass allowed to stand. The ether layer is separated from the alcohol-water layer, washed with water and dried. The ether solvent is then removed on a hot-water bath. There is obtained 172.5 parts by weight of a clear colorless oil which oil is a mixture of levo rotatory isomer of trans-1-methylene-2-keto-10-methyl-1,2,5,8,9,10-hexahydronaphthalene, $\alpha_D^{25}=-287$ (c.=2, CHCl₃), B. P. =120–125° C./3 mm., and levo rotatory isomer of trans-1-methylol-2-keto-10-methyl-1,2,5-8,9,10-hexahydronaphthalene, $\alpha_D^{25}=-272$ (c.=2, CHCl₃), M. P. 77–78° C. The former is separated from the latter by distillation at reduced pressure.

Although formaldehyde may be employed in theoretical amounts it is preferred that it be used in preparing Compounds IIa and/or IIb in large excess.

Employing the foregoing procedure of Example I but replacing the levo rotatory isomer reactant with an equal weight of dl-trans-1-(hydroxy) methylene-2-keto-10-methyl-1,2,5,8,9,10-hexahydronaphthalene there is obtained a mixture of dl-trans-1-methylene-2-keto-10-methyl-1,2,5,8,9,10-hexahydronaphthalene and dl-trans-1-methylol-2-keto-10-methyl-1,2,5,8,9,10-hexahydronaphthalene.

Since 1-methylene-2-keto-10-methyl-1,2,5,8,9,10-hexahydronaphthalene (Compound IIa) and 1-methylol-2-keto-10-methyl-1,2,5,8,9,10-hexahydronaphthalene (Compound IIb) respectively upon reacting with dihydroresorcinol in substantially equimolecular amounts provide 1-(2,6-diketo-cyclohexyl) methyl-2-keto-10-methyl-1,2,5,8,9,10-hexahydronaphthalene (Compound III), it is not necessary to separate the products obtained upon reacting formaldehyde with 1-(hydroxy) methylene-2-keto-10-methyl-1,2,5,8,9,10-hexahydronaphthalene prior to reacting with dihydroresorcinol in the second step of the process schematically set forth hereinbefore. The reaction is ordinarily carried out at temperatures below about 70° C. provided the system is fluid and in the presence of an alkali metal alkoxide such as the sodium and potassium alkoxides of low molecular weight aliphatic alcohols. The solvent in general will be the alcohol corresponding to that which forms the alkoxide. As illustrative of the second step of the process of this invention is the following:

*Example II*

To a suitable reaction vessel is added 33.2 parts by weight of the clear colorless oily product of Example I, 22.5 parts by weight of dihydroresorcinol and 320 parts by weight of tert. butyl alcohol and the mixture agitated under a nitrogen atmosphere. While agitating the mix 24.5 parts by weight of potassium tert. butyl alcoholate dissolved in 200 parts by weight tert. butyl alcohol is added. The mix is permitted to rise to a temperature of 50° C. and maintained at that temperature for 16 hours. The mix is subjected to vacuum distillation in order to remove tert. butyl alcohol. The viscous red residue is triturated with water and chloroform and the layers separated. The aqueous layer is acidified and extracted with diethyl ether. The ether extracts are combined, dried, and the solvent removed on a steam bath. There is obtained 43.6 parts by weight of a light orange colored solid (M. P. 115–116° C.) which upon recrystallization from ligroin gives pure levo rotatory isomer of trans-1-(2,6-diketo-cyclohexyl) methyl-2-keto-10-methyl-1,2,5,8,9,10-hexahydronaphthalene, M. P. 115–116° C., $\alpha_D^{25}=-20.6$ (c.=2, CHCl₃).

In a similar manner dl-trans-1-(2,6-diketo-cyclohexyl) methyl-2-keto-10-methyl-1,2,5,8,9,10-hexahydronaphthalene is obtained from either dl-trans-1-methylene-2-keto-10-methyl-1,2,5,8,9,10-hexahydronaphthalene or dl-trans-1-methylol-2-keto-10-methyl-1,2,5,8,9,10-hexahydronaphthalene or a mixture thereof.

In the final step of the process outlined hereinbefore 1-(β-carboxyethyl)-2-keto-14-methyl-$\Delta^{6,9,11(1)}$-octahydrophenanthrene (Compound IV) is prepared by cyclizing 1-(2,6-diketo-cyclohexyl) methyl-2-keto-10-methyl-1,2,5,8,9,10-hexahydronaphthalene employing an alkali metal hydroxide such as sodium or potassium hydroxide in an aqueous system. As illustrative of this step is the following:

*Example III*

In a suitable reaction vessel 2.86 parts by weight of levo rotatory trans-1-(2,6-diketo-cyclohexyl) methyl-2-keto-10-methyl-1,2,5,8,9,10-hexahydronaphthalene is dissolved in about 100 parts by weight of 0.5 N sodium hydroxide and the solution refluxed for 24 hours. The mass is cooled to room temperature and extracted with diethyl ether. The aqueous layer is then acidified, filtered, and the filter cake washed with water and dried. The dried crystalline product is the levo-rotatory isomer of anti-trans-1-(β-carboxyethyl)-2-keto-14-methyl-$\Delta^{6,9,11(1)}$-octahydrophenanthrene, M. P. 101–102° C., $\alpha_D^{25}=-374$ (c.=2, CHCl₃).

In a similar fashion dl-anti-trans-1-(β-carboxyethyl)-2-keto-14-methyl-$\Delta^{6,9,11(1)}$-octahydrophenanthrene is obtained from dl-anti-trans-1-(2,6-diketo-cyclohexyl) methyl-2-keto-10-methyl-1,2,5,8,9,10-hexahydronaphthalene.

This application is a continuation-in-part of Serial No. 436,718, filed June 14, 1954. In said co-pending application there is descrbed in detail the preparation of 17-formyl-cyclopentano-10,13-dimethyl-$\Delta^{4,9(11)}$-decahydrophenanthren-3-one from 1-(β-carboxyethyl)-2-keto-14-methyl-$\Delta^{6,9,11(1)}$-octahydrophenanthrene which cyclopentanopolyhydrophenanthrene compounds are further shown therein to be convertible to such steroids as $\Delta^{9(11)}$-progesterone.

What is claimed is:

1. The levo-trans isomer of 1-methylol-2-keto-10-methyl-1,2,5,8,9,10-hexahydronaphthalene.

2. The levo-trans isomer of 1-methylene-2-keto-10-methyl-1,2,5,8,9,10-hexahydronaphthalene.

3. The mixture obtained upon reacting the levo-trans isomer of 1-(hydroxy) methylene-2-keto-10-methyl-1,2,5,8,9,10-hexahydronaphthalene and formaldehyde in a fluid medium in the presence of aqueous sodium hydroxide at a temperature less than 25° C.

4. The levo-trans isomer of 1-(2,6-diketo-cyclohexyl) methyl-2-keto-10-methyl-1,2,5,8,9,10-hexahydronaphthalene.

5. The process which comprises reacting the levo-trans isomer of 1-(hydroxy) methylene-2-keto-10-methyl-1,2,5,8,9,10-hexahydronaphthalene with formaldehyde in a fluid medium in the presence of an alkali metal hydroxide at a temperature less than 25° C.

6. The process which comprises reacting the composition of claim 3 with dihydroresorcinol in substantially equimolecular proportions in the presence of an alkali metal alkoxide.

7. The process of claim 6 wherein the alkali metal alkoxide is potassium tert. butyl alkoxide.

8. The process which comprises refluxing the compound of claim 4 with an alkali metal hydroxide in an aqueous system.

9. The process of claim 8 wherein the alkali metal hydroxide is sodium hydroxide.

No references cited.